Patented Jan. 17, 1950

2,495,202

UNITED STATES PATENT OFFICE 2,495,202

HETEROCYCLIC FLUORESCENT COLORING MATERIALS

Joseph L. Switzer, Cleveland Heights, and Richard A. Ward, Cleveland, Ohio; said Ward assignor to said Joseph L. Switzer and Robert C. Switzer, South Euclid, Ohio No Drawing. Application July 9, 1945,
Serial No. 604,096

14 Claims. (Cl. 260—250)

1

This invention relates to improvements in water-soluble coloring substances and processes of preparing them, and, more particularly, to a new class of substances which exhibit strong orange or red daylight fluorescence when dissolved in water, particularly sea water.

Certain water-soluble fluorescent dyes have been used for identification and signaling material in sea rescue work, small quantities of the dyes possessing sufficient color, augmented by their fluorescence in response to incident sunlight, to color large areas of water. Such dyes, however, have so far been limited to those which are greenish or yellow greenish when dissolved in water.

It is an object of this invention to provide a coloring material which readily dissolves in water, particularly sea water, and, when so dissolved, exhibits a strong orange or red daylight fluorescence when in dilute solution, the term "daylight fluorescence" being used to denote the property of the material to exhibit color not only by the phenomenon of reflection and absorption but also to fluoresce in response to both invisible ultraviolet and, more importantly, visible light in incident sunlight or light having a spectrum approaching that of sunlight. The advantage of such materials over those heretofore available is that the orange or red daylight fluorescent color provides a better contrast to the color of the sea.

Another advantage of these new materials is that, while they readily dissolve in water, including sea water, they are not hydrolyzed by the water.

Other objects and advantages of these new coloring materials and the processes of making them will be apparent from the following specification and claims. It is to be understood that while these coloring materials are advantageously employed as an identification and signaling material for use on the ocean or other bodies of water, the materials are not limited to such use but may be employed for coloring a wide variety of aqueous solutions for purposes of display, tracing, or identification.

In general, the new materials comprise the alkyl quaternary salts derived from complex azines, having the general formula

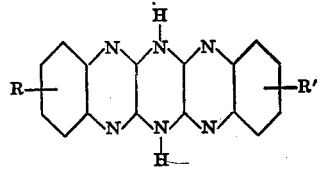

in which R and R' consist of hydrogen and substituents for hydrogen.

A satisfactory procedure for preparing the parent substance for the new coloring materials is as follows:

Step 1

76 parts of oxalic acid ($H_2C_2O_4 \cdot 2H_2O$), 54 parts of ortho phenylene diamine, and 30 parts of triethylene glycol are heated together with good stirring. In the neighborhood of 145° C., all solids go into solution. Water vapor is given off. The solution is heated further with a continuously rising temperature until 200° C. is reached. In the latter stages of the process, crystals are formed throughout the liquid until at the end a thin mush is obtained. The mix is cooled, diluted with 120 parts of water, and then filtered. The filter cake is washed well with water and dried. This process results in the formation of 67 parts of 2,3 dihydroxyquinoxaline, represented by the formula

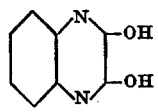

which usually has a faint gray-green color, although the absolutely pure material is colorless. It is not necessary to purify this substance further for the next step. Other solvents, such as polyethylene glycol #300 may be used very successfully.

Step 2

20 parts of phosphorus oxychloride are charged into a glass-lined reaction vessel and from time to time a mixture of 108 parts of dihydroxyquinoxaline and 297 parts of powdered phosphorous pentachloride is added in portions to the phosphorous oxychloride. After the addition of each portion, the kettle, which is provided with a reflux condenser, is heated until the reaction is largely completed for that portion; then the next portion is added. A single phase is never formed at any time but the dihydroxyquinoxaline is converted quite completely into the dichloro compound. It is possible to add all ingredients at once, but if this is done, it is necessary to start with a larger quantity of phosphorous oxychloride, for example, 216 parts. The latter procedure is recommended for large-scale production, whereas the first method proves to be better for small laboratory preparations. It is difficult to obtain good heat transfer through a large batch of the substance, and constant effective stirring is necessary. In some instances using the larger amount of phosphorous oxychloride, it happens that a single clear liquid is formed. When all ingredients are in the kettle and the initial, vigorous reaction is over, the whole is heated under reflux for an hour. The phosphorous oxychloride is then distilled off until the temperature reaches 150° C. The melt is allowed to run slowly into a large volume of water which is vigorously stirred. The crude 2,3 dichloroquinoxaline is filtered off, crushed or ground until quite fine, and boiled with ten times its volume of water. It is re-filtered and re-boiled with 900 parts of water containing 27 parts of sodium hydroxide. This dissolves any unchanged dihydroxyquinoxaline and removes acidic impurities. The final product, represented by the formula

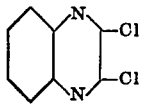

is filtered off, washed thoroughly with water and dried. In some cases, nearly theoretical yields have been obtained.

Step 3

5 g. of ortho phenylene diamine are dissolved in 50 cc. of methyl alcohol, whereupon, with good cooling, cyanogen gas (prepared from mercuric cyanide and mercuric chloride) is led in slowly up to saturation. The solution, which becomes brown in the course of the reaction precipitates, in about three days, hard, brown-colored crystals in copious quantities. In order to effect the preparation of pure 2,3 diaminoquinoxaline, represented by the formula

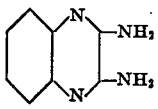

one pulverizes the crystals as fine as possible and recrystallizes from about 10% alcohol. The yield amounts to about 70% of theory.

In working with larger quantities, it is best to remove tars from the crude diaminoquinoxaline by dissolving this substance in methyl Cellosolve and adding limited amounts of water, for example, an equal volume. In this way, tarry material is precipitated without much precipitation of the diamino compound. After filtration, large quantities of water are added to finally precipitate the diamine.

Step 4

103 parts of 2,3 diaminoquinoxaline (Step 3) and 192 parts of 2,3 dichloroquinoxaline (Step 2) are intimately mixed and heated in a reaction vessel with continuous stirring. A stirring system which scrapes the walls is recommended. At about 150° C., the material begins to melt. As the temperature is raised, it becomes more liquid, and then later crystallizes, the highest temperature being 270° C. The reaction product is extracted with about 400 parts of methyl Cellosolve, filtered, washed, and re-worked twice with warm methyl Cellosolve, finally washing with alcohol. The complex azine thus obtained is a yellowish-brown powder. As much as 65% of the theoretical amount calculated on the diaminoquinoxaline may be produced. The complex azine so produced is represented by the structural formula

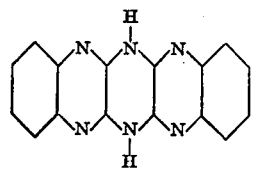

It is to be understood in using the above simplified form that the nitrogen atoms in the second and fourth rings are tertiary nitrogen atoms and have an equivalent of three bonds in the ring. This should be borne in mind in the structures given throughout this specification and claims.

The above unsubstituted parent substance for the new water-soluble coloring materials provided by this invention is very difficultly soluble in the usual organic solvents. Whenever it is dissolved in neutral solvents, it may have but a weak yellow or green fluorescence. A red fluorescence in solution arises only on treating with mineral acids, conveniently after first dissolving the parent substance in hot glacial acetic acid. Such acidification produces a mineral acid salt in which it is likely that, in solution, several of the tertiary nitrogen atoms, that is, in the second and fourth rings, are carried over into positively charged ions through salt formation. By adding the salt to water, however, the salt rapidly hydrolyzes, regenerating the parent substance as a weakly fluorescing brownish yellow precipitate. Thus, it is impossible to make use of the red fluorescence of these mineral acid salts in dilute water solution, since their positive ions are totally unstable in water.

The new substances provided by this invention contain alkyl groups attached to ring nitrogens and are quaternary salts which dissolve very easily in water with intense color and without decomposition. Usually the solutions are characterized by striking orange or red fluorescence. This fluorescence is not only excited by ultraviolet light, but notably by visible light, thereby making the fluorescent solution unusually visible in daylight. Illustrative but not limitative examples of such alkyl quaternary salts of the parent substance itself or of derivatives containing substituents for hydrogen in the terminal rings are as follows:

Example 1

10 parts by weight of the parent substance, as prepared above, are heated with 34 parts by weight of dimethylsulfate for 2½ hours at 150° to 160° C. To the reaction mixture, 94 parts by weight of anhydrous alcohol are added and, after cooling, the precipitate which forms is filtered off. The precipitate is washed well with anhydrous alcohol. This yields at least 12½ parts of the methylation product, a quaternary salt represented by the formula

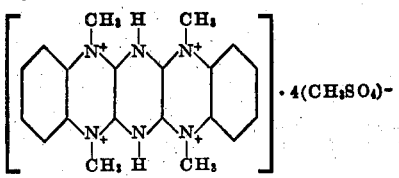

This may be purified by careful recrystallization. The crystals have a strong green reflex and readily dissolve in water, the dilute solution having a powerful red-orange fluorescence.

Example 2

If the sulfate rather than the methylsulfate of Example 1 is desired, it can be obtained in admixture with sodium sulfate by first hydrolyzing the methylsulfate ions by means of hot water, cooling, and then treating with the equivalent quantity of dilute sodium hydroxide. Considering the negative ions only:

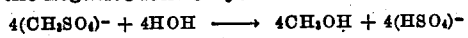

and

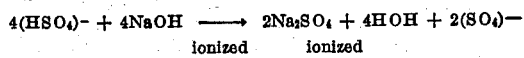

As the result of this treatment, there is produced the compound represented by the formula

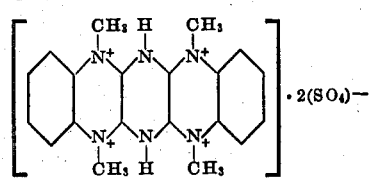

This substance can be obtained in large well-defined crystals having a very strong green reflex. The substance is violet, however, when pulverized and spread thin. The crystals dissolve easily in water to form a concentrated solution having a deep magenta color. A red-orange daylight fluorescence is evident in solutions of one part in 200 parts of water. On diluting with large volumes of water, as from 1,000 to 25,000 parts, for example, the solutions are seen in daylight to take on an exceptionally powerful red-orange fluorescence. In the spectrophotometer the dilute solutions show an absorption maximum at 5200 A. U. and a nearly equal peak at 5500 A. U. On adding alkali and allowing to stand, the fluorescence shifts towards the green and becomes much weaker. In water alone however, and this is true for salt water as well, the strong red-orange fluorescence persists for long periods, showing the methylated product to be quite resistant to hydrolysis. The crystals with green reflex can be recovered unchanged by evaporating the water from the aqueous solutions.

Example 3

The parent substance is heated with an excess of methyl p-toluene sulfonate at the boiling point. The resulting deep red liquid is shaken with both benzene and water. The benzene holds the excess methyl p-toluene sulfonate while the highly ionized reaction product, a quaternary salt, is taken up by the water. In this substance the negative ion is the p-toluene sulfonate ion. The substance may be isolated by evaporating the water. Dilute solutions in water possess a very powerful red-orange fluorescence in daylight. Thus it is seen that the nature of the negative ion can be varied without changing the essential color and fluorescence characteristics in the final product.

Example 4

3 parts of the parent substance are heated with 50 parts of ethyl benzene sulfonate at 250° C. for 5 minutes. The ethyl benzene sulfonate used in this work was specially prepared from pure grain alcohol to make certain that it would contain none of the methyl derivative. The reaction mixture is treated with water and extracted twice with benzene. On evaporation of the aqueous phase, as in a vacuum oven, there is deposited the dark bluish-red ethyl quaternary compound, a salt of benzene sulfonic acid.

Example 5

3 parts of the parent substance are heated with 50 parts of propyl benzene sulfonate at 250° C. for five minutes. The reaction mixture is treated with water and extracted with benzene. On evaporation of the aqueous phase, one obtains a propyl quaternary compound, a salt of benzene sulfonic acid. In dilute solutions the substance exhibits a red-orange fluorescence.

Example 6

The sulfonic acid of the parent substance, obtained by sulfonation, is represented by the formula

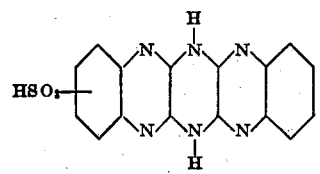

The above derivative, a violet powder easily soluble in dilute sodium hydroxide with a red brown color is heated with an excess of ethyl benzene sulfonate at a temperature above 200° C. for 15 minutes. On extracting the cooled mixture with water a strong red-orange fluorescing aqueous phase is formed in which the color and power of the daylight fluorescence is apparently equal in all respects to that obtained by methylating the parent substance itself.

Example 7

Similarly the disulfonic acid having the structure

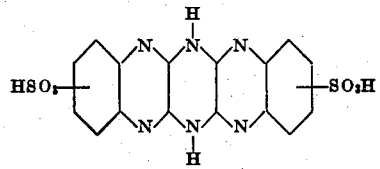

yields on alkylation water soluble red-orange fluorescing products.

Example 8

The hydroxy derivative of the parent substance, represented by the formula

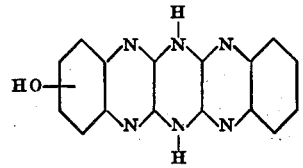

is prepared by fusing the sulfonic acid with double its weight of potassium hydroxide at 300° C. and acidifying in the cold. It is soluble in dilute sodium hydroxide with a moss-green fluorescence. If the hydroxy derivative of the parent substance is boiled with alkyl esters of benzene sulfonic acid, alkyl quaternary compounds are formed. These dissolve in water with an orange fluorescence in daylight or ultraviolet light.

In the following claims, the term "water-stable" as applied to a particular substance is to mean that the substance is not readily decomposed, precipitated, or hydrolyzed when added to water. The term "alkylating" as used here refers to the attaching of alkyl groups to ring nitrogens, giving said nitrogens a positive charge. It is important to note that these alkylation products show little or no fluorescence in the solid state, although they may on substrata, such as cellulose.

What is claimed is:

1. The process of preparing coloring materials having water-stable positive ions which comprises adding an alkyl radical to a ring nitrogen of a substance represented by the formula:

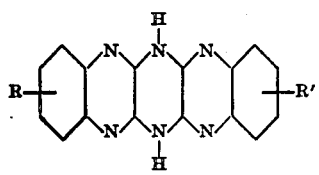

in which R and R' consist of hydrogen and hydroxyl and sulfo substituents for hydrogen.

2. The process of preparing water-soluble coloring materials exhibiting, in aqueous solution, daylight fluorescence ranging from orange to red comprising the step of reacting a substance of the formula shown in claim 1 with an alkyl ester of an acid of the group consisting of sulfuric acid and sulfonic acids to form an alkyl quaternary salt of the said substance.

3. The process of preparing water-soluble coloring materials exhibiting, in aqueous solution, daylight fluorescence ranging from orange to red comprising the step of reacting a substance of the formula shown in claim 1 with a methyl ester of an acid of the group consisting of sulfuric acid and sulfonic acids to form an alkyl quaternary salt.

4. The process of preparing water-soluble quaternary salts, having water-stable positive ions, of the substance of the formula shown in claim 1 comprising the step of reacting said substance with alkyl sulfates.

5. The process of preparing water-soluble quaternary salts, having water-stable positive ions, of the substance of the formula shown in claim 1 comprising the step of reacting said substance with an alkyl ester of an aryl sulfonic acid.

6. The process of preparing a water-stable water-soluble coloring material exhibiting in aqueous solution a red-orange daylight fluorescence comprising the step of reacting the parent substance represented by the formula

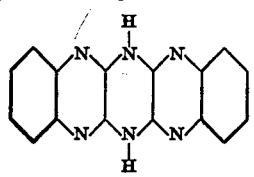

with dimethyl sulfate to form a methyl quaternary salt of the parent substance.

7. The process of claim 6 including the further steps of hydrolyzing said salt and treating sodium hydroxide to form an alkyl quaternary sulfate of the parent substance.

8. As a composition of matter, alkyl quaternary salts containing the nucleus represented by the formula

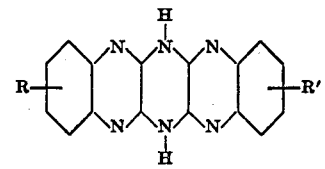

in which R and R' consist of hydrogen and hydroxyl and sulfo substituents for hydrogen.

9. As a composition of matter, a quaternary salt consisting of the anion of an inorganic acid and a cation comprising a structure having an alkyl radical added to a nitrogen of the nucleus shown in claim 8.

10. As a composition of matter, a salt as defined in claim 8 in which the anion is the negative ion of an aryl sulfonic acid.

11. As a composition of matter, a salt as defined in claim 8 in which the anion is the negative ion of benzene sulfonic acid.

12. As a composition of matter, the quaternary compound derived from the reaction of dimethyl sulfate with a substance represented by the formula shown in claim 8.

13. As a composition of matter, the compound represented by the formula

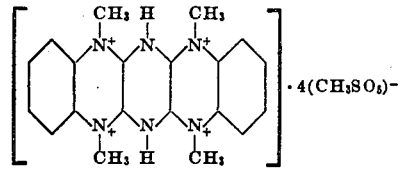

14. As a composition of matter, the compound represented by the formula

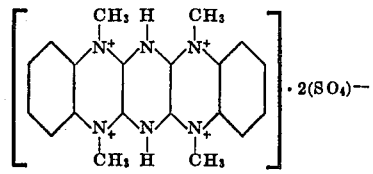

JOSEPH L. SWITZER.
RICHARD A. WARD.

REFERENCES CITED

The following references are of record in the file of this patent:

Hackh's: Chemical Dictionary, third edition, page 33.